US012231564B2

(12) United States Patent
Nagarjuna et al.

(10) Patent No.: US 12,231,564 B2
(45) Date of Patent: Feb. 18, 2025

(54) CREDENTIAL-FREE AUTHENTICATION SYSTEMS AND METHODS

(71) Applicants: Phani Nagarjuna, Danville, CA (US); Gene Allen, Magnolia, TX (US); Sara Duryea, Hillsborough, CA (US); Geoff Halstead, Danville, CA (US)

(72) Inventors: Phani Nagarjuna, Danville, CA (US); Gene Allen, Magnolia, TX (US); Sara Duryea, Hillsborough, CA (US); Geoff Halstead, Danville, CA (US)

(73) Assignee: Circle Systems, Inc., Oakland, CA (US)

(*) Notice: Subject to any disclaimer, the term of this patent is extended or adjusted under 35 U.S.C. 154(b) by 228 days.

(21) Appl. No.: 18/108,580

(22) Filed: Feb. 11, 2023

(65) Prior Publication Data

US 2023/0283472 A1   Sep. 7, 2023

Related U.S. Application Data

(60) Provisional application No. 63/316,854, filed on Mar. 4, 2022.

(51) Int. Cl.
*H04L 29/06* (2006.01)
*H04L 9/08* (2006.01)
*H04L 9/32* (2006.01)

(52) U.S. Cl.
CPC ............ *H04L 9/321* (2013.01); *H04L 9/0861* (2013.01)

(58) Field of Classification Search
CPC . H04L 9/321; H04L 9/088; H04L 9/50; H04L 63/0861; H04L 9/0897; H04L 63/0823; H04L 9/3231; H04L 9/40; H04L 9/0861; H04L 2209/603; H04L 63/0227; H04L 67/02; H04L 2209/805
See application file for complete search history.

(56) References Cited

U.S. PATENT DOCUMENTS

2020/0160319 A1* 5/2020 Smith .................... G06Q 20/36

* cited by examiner

*Primary Examiner* — Tri M Tran
(74) *Attorney, Agent, or Firm* — PatentPC Power Patent; Bao Tran

(57) ABSTRACT

Systems and methods are disclosed for performing access control method by running a security software service as a localhost web service on an endpoint device; communicating with a system web server which manages licensing of the system and authentication of the endpoint device; creating a secure digital capsule that is controlled and can only be accessed by the system web server which authenticated the user and authorized the endpoint device; and placing on a distributed ledger messages and data files stored in the system in the secure digital capsules to detect and prevent alteration or manipulation of data.

16 Claims, 16 Drawing Sheets

Chain of Trust

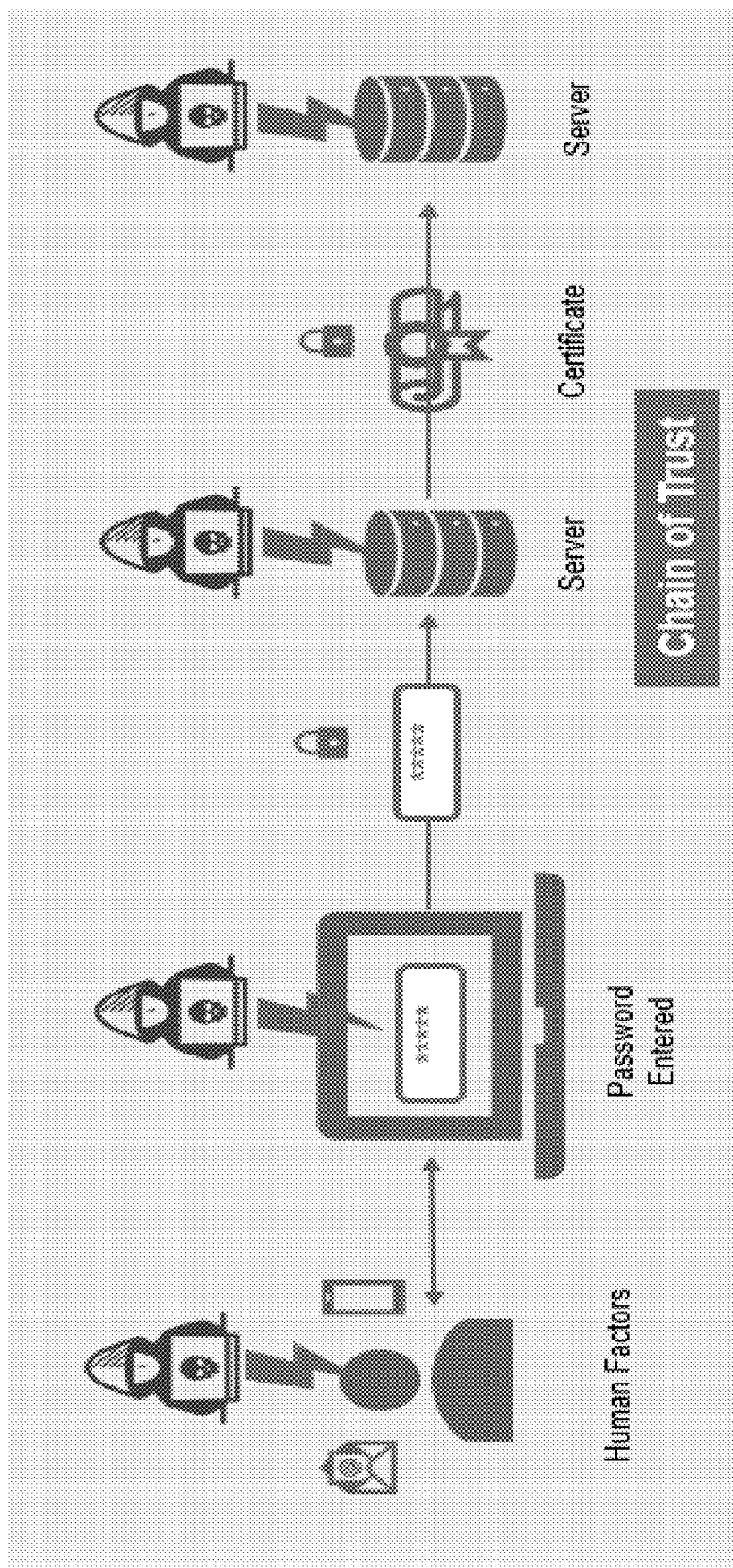
FIG. 1: Chain of Trust

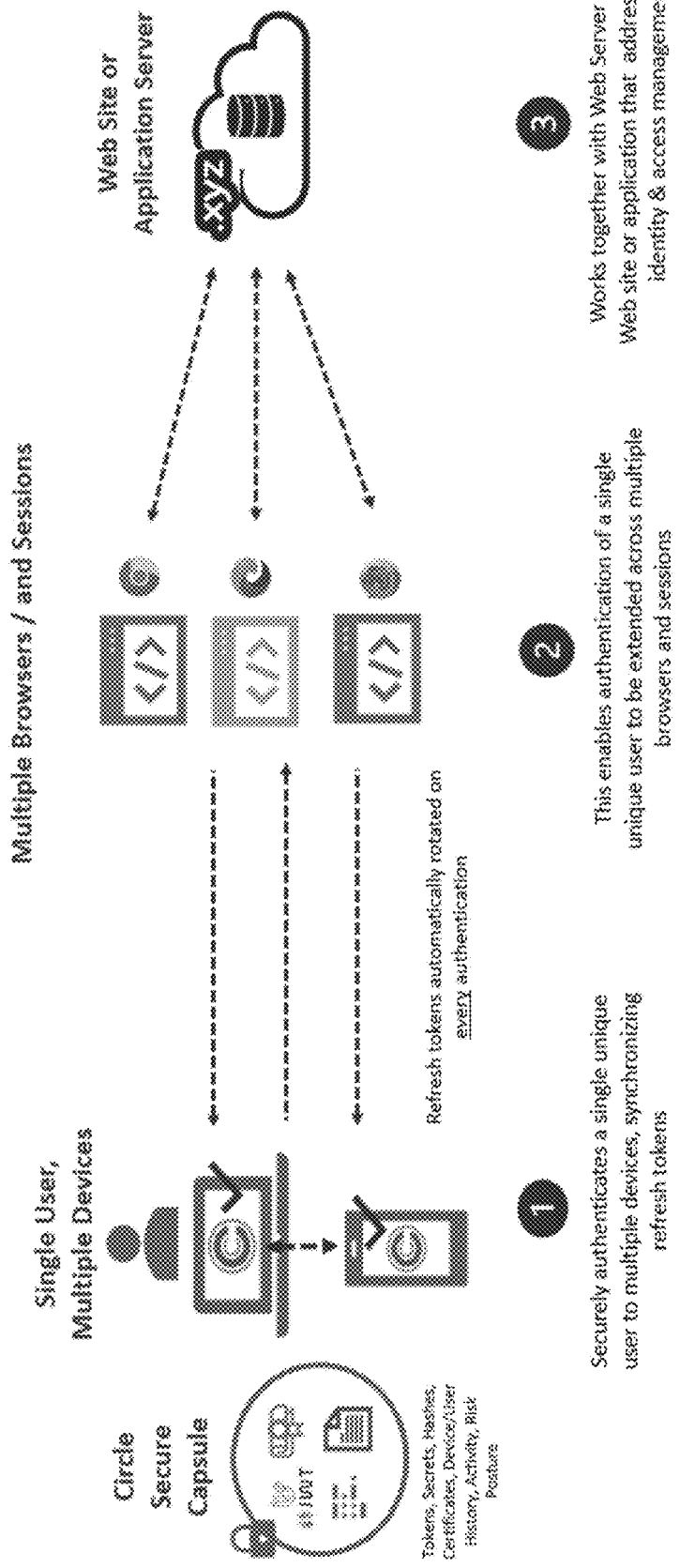
FIG. 2: Deployment of a Secure Capsule Across Multiple Devices to Provide access to Web Site/Application Server

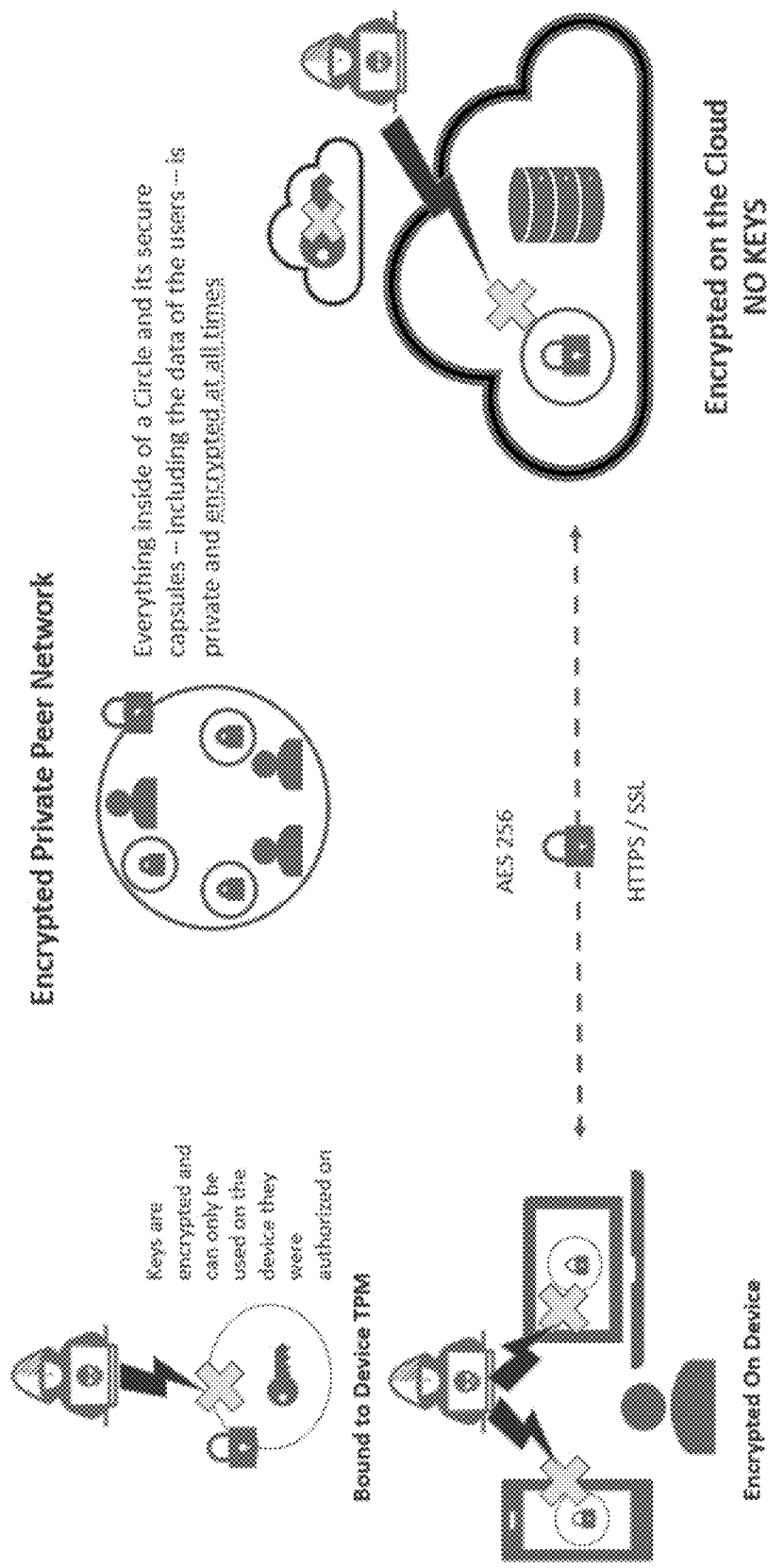
FIG. 3A Circles and Secure Capsules

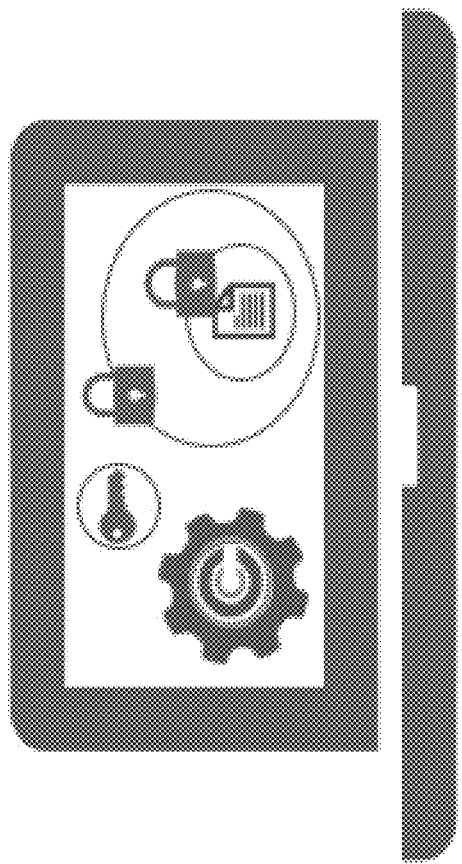
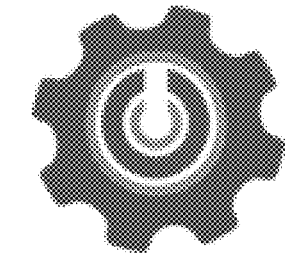
FIG. 3B Circle Service

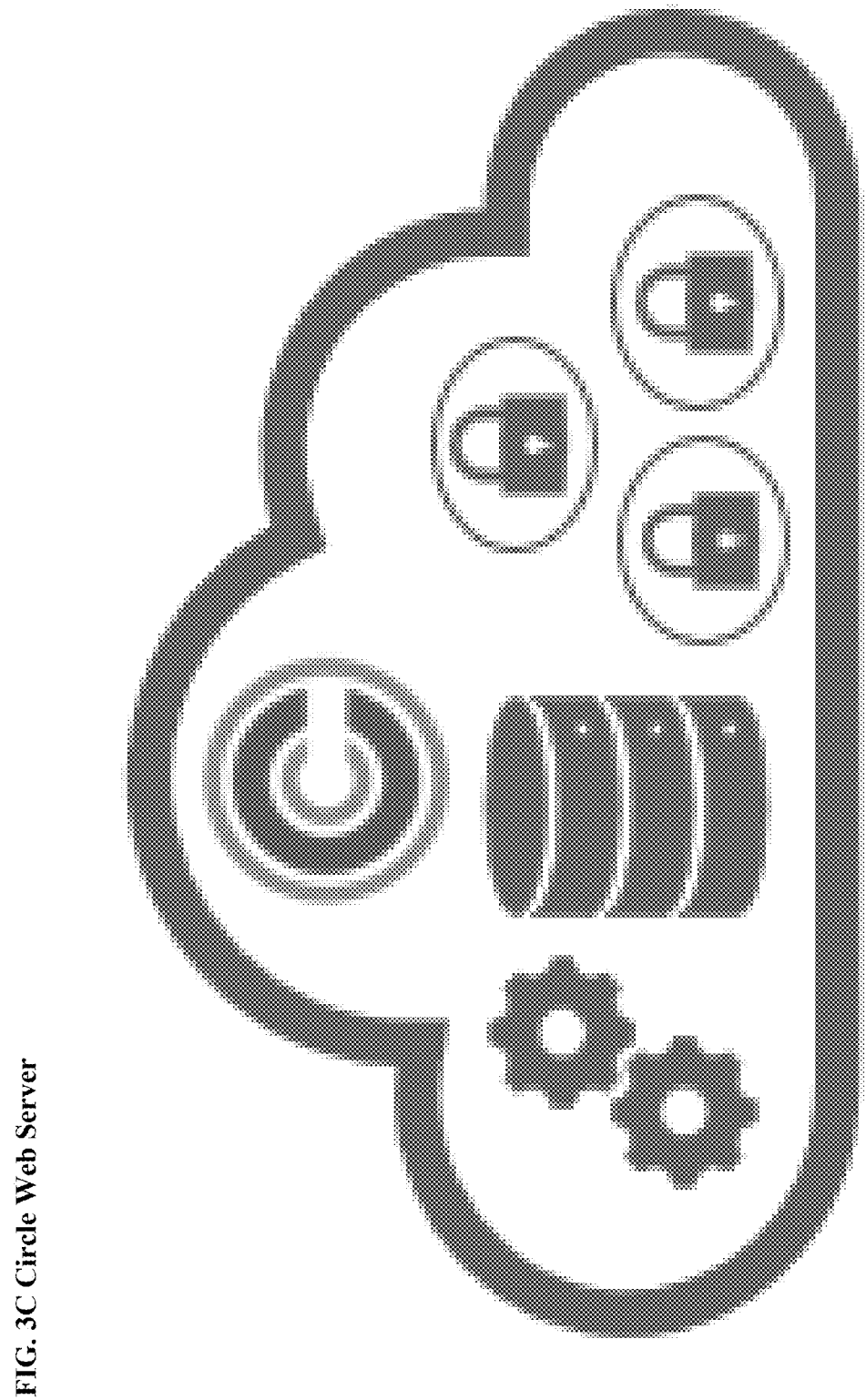
FIG. 3C Circle Web Server

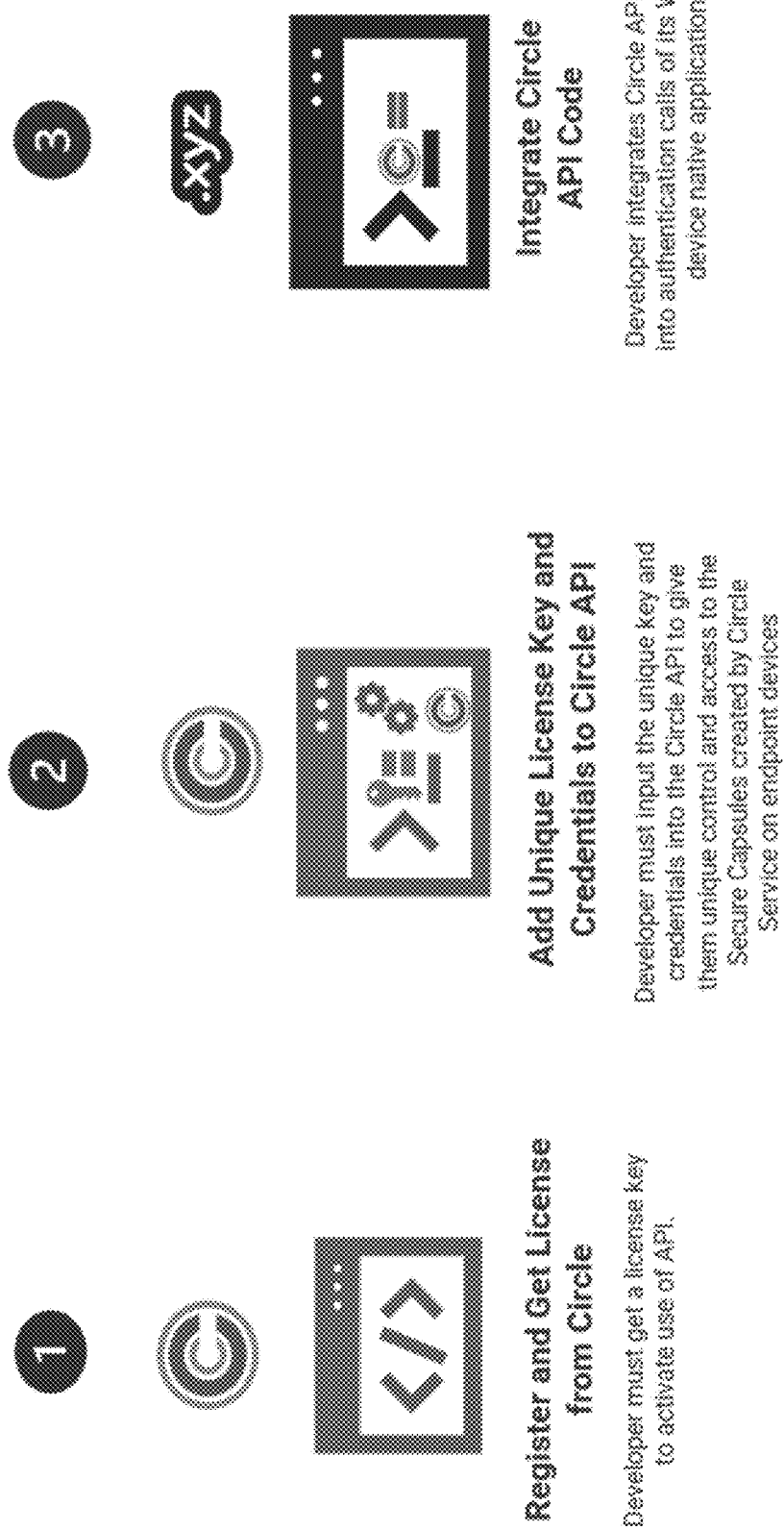
FIG. 4A: Set Up of the Web Server for Integration with Circle CFA

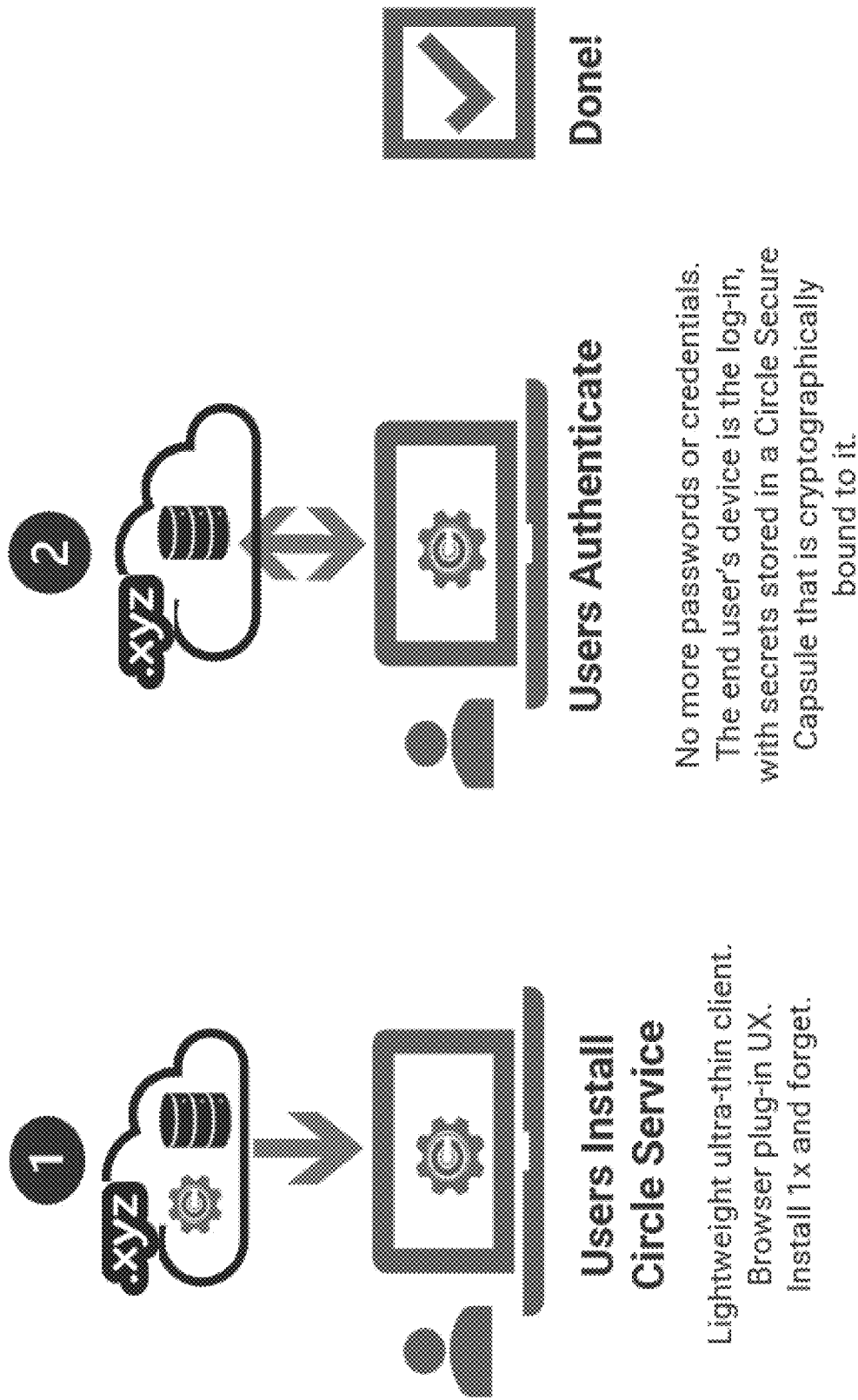
FIG. 4B CFA End User Experience after Integration

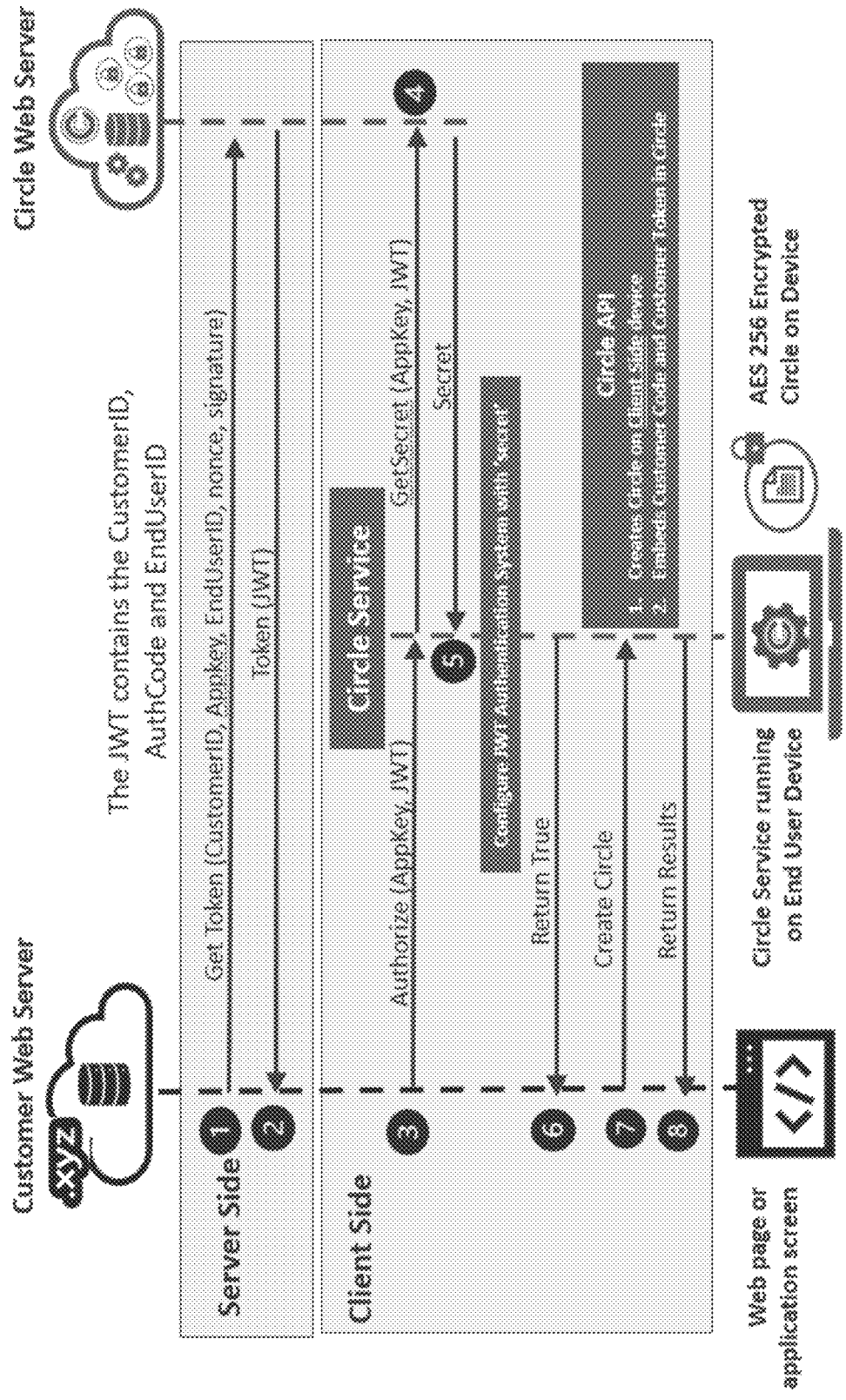
FIG. 4C Authentication Flow for Circle Service

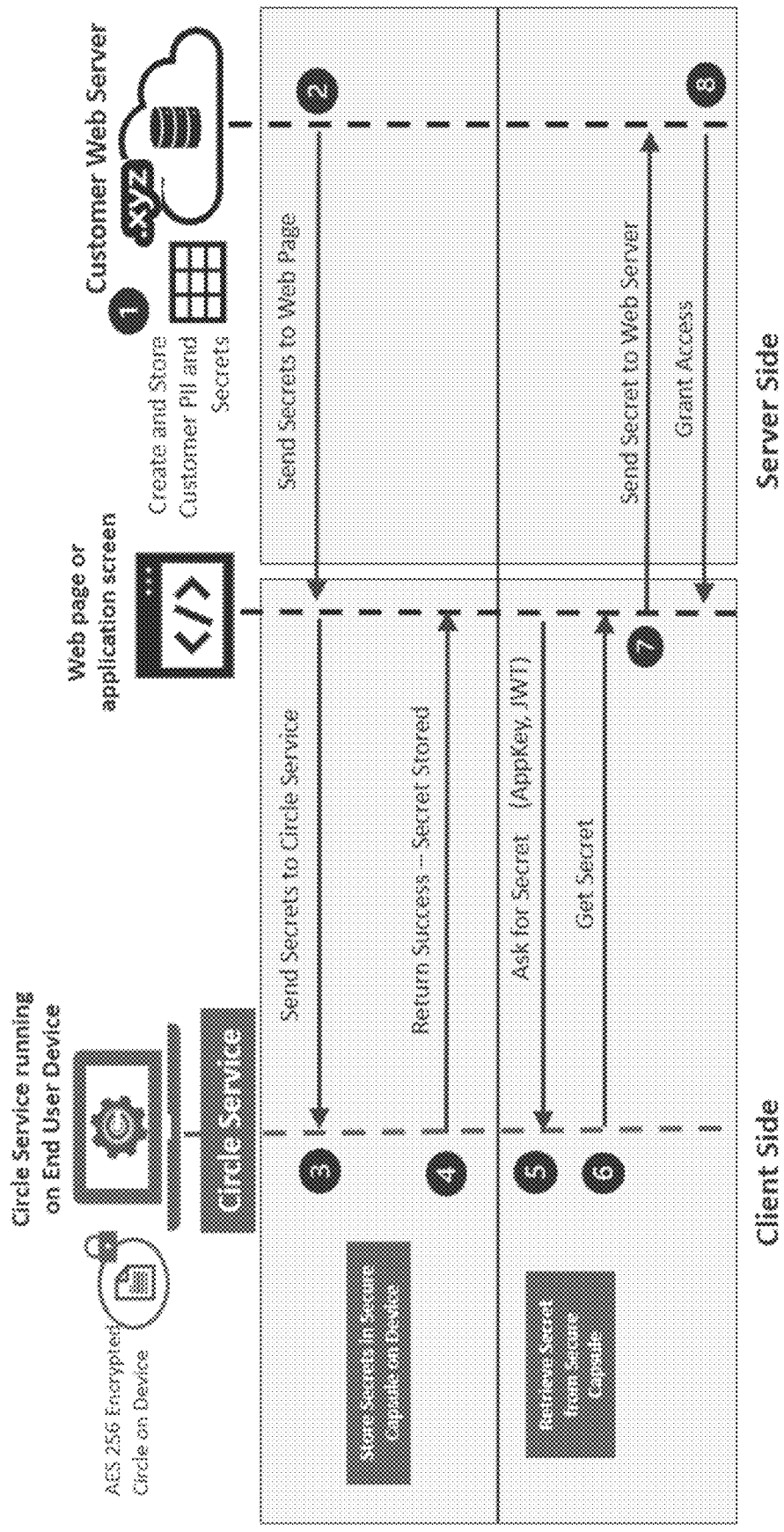
FIG. 4D Flow for Circle CFA

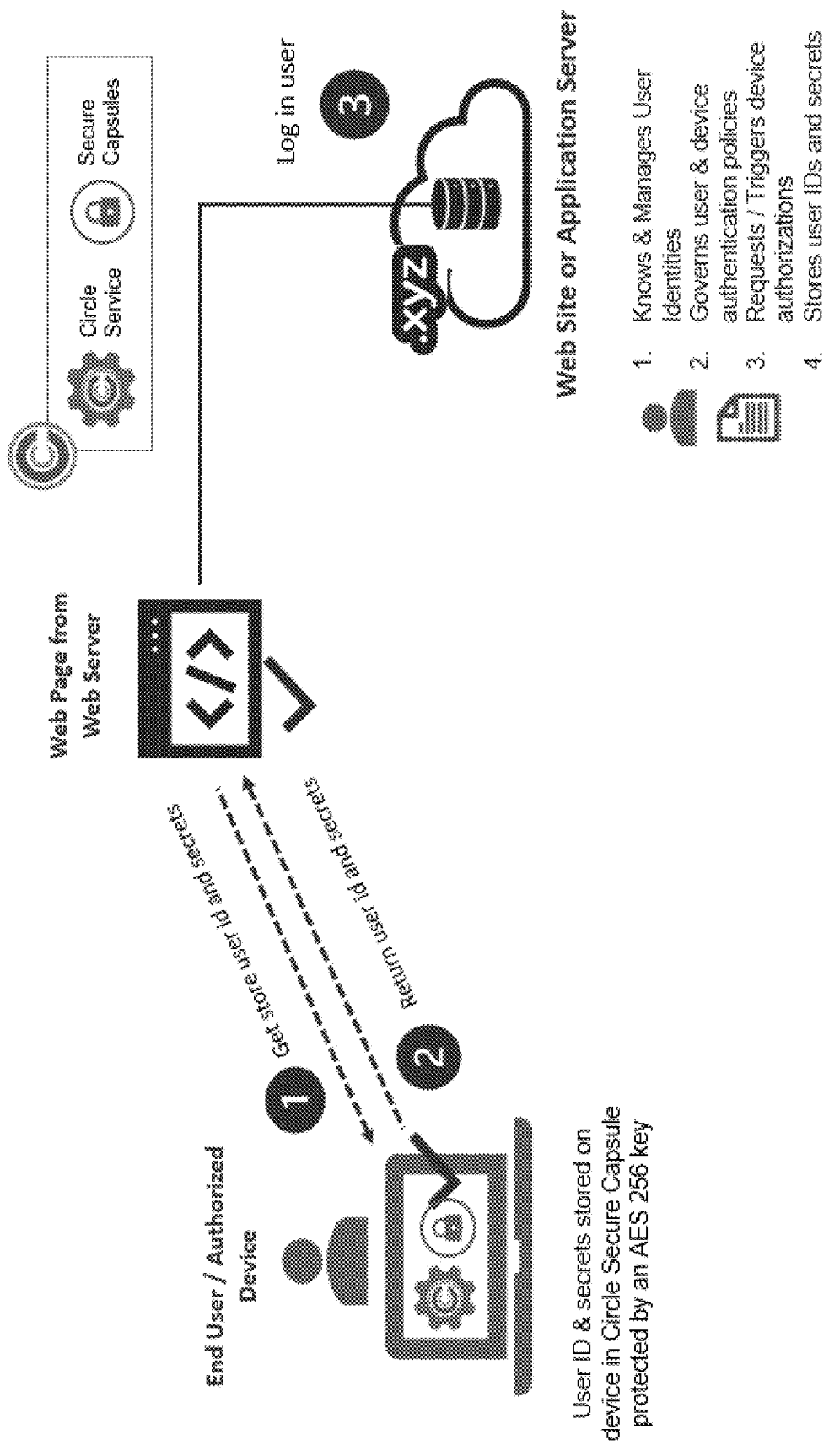
FIG. 4E Adding and Authenticating Additional Devices

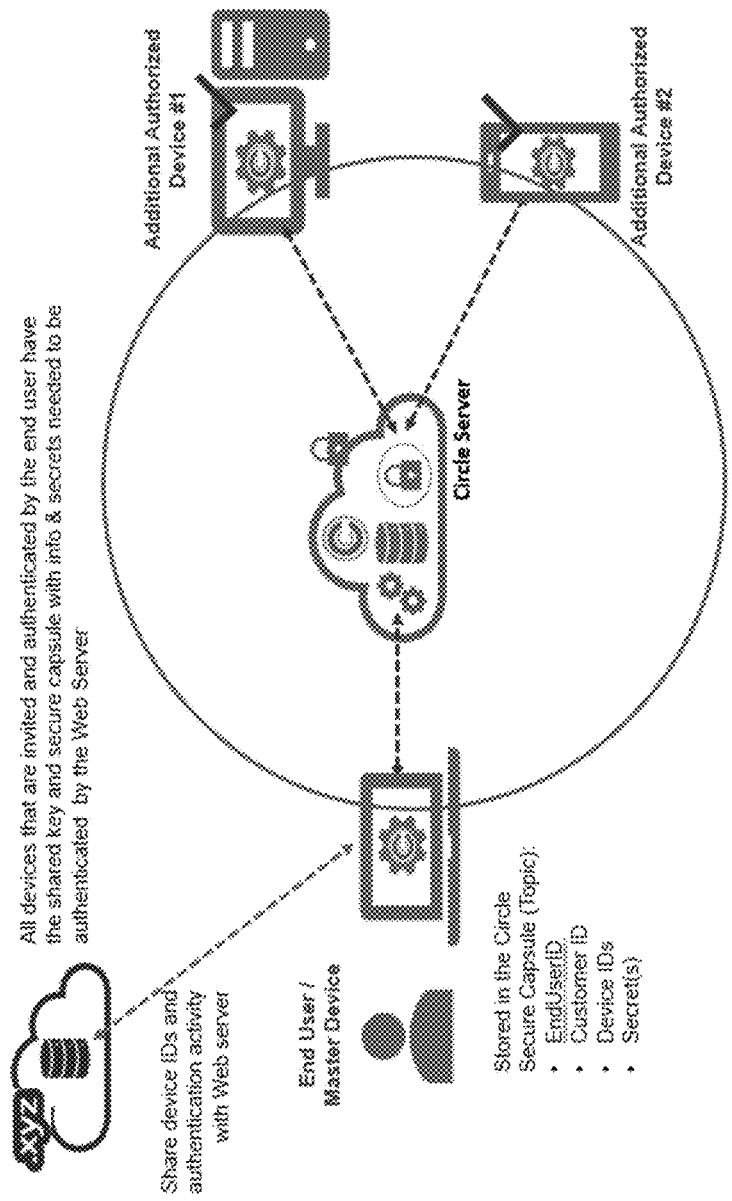
FIG. 4H CFA Flow - Auto-Reauthentication

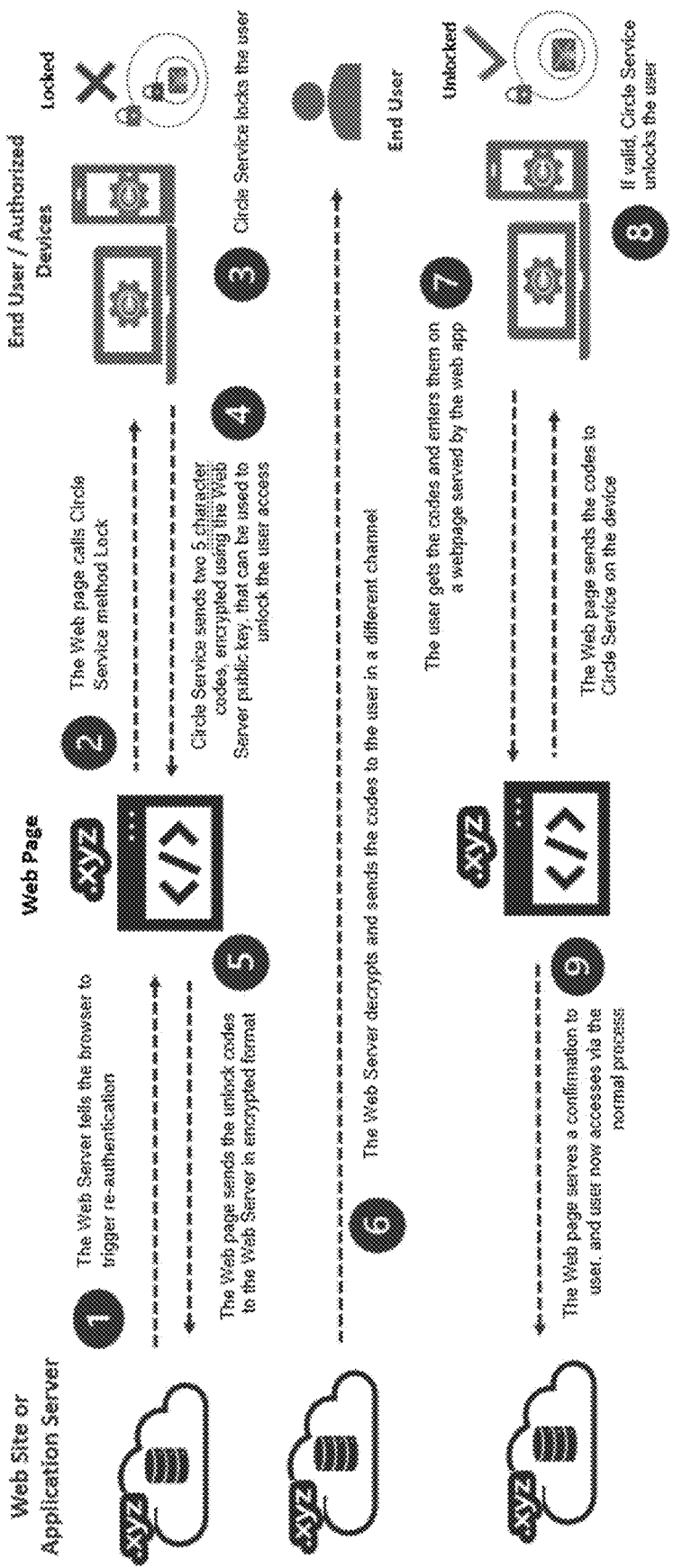
FIG. 4I shows an exemplary Use of Biometric Information for Granular Authentication

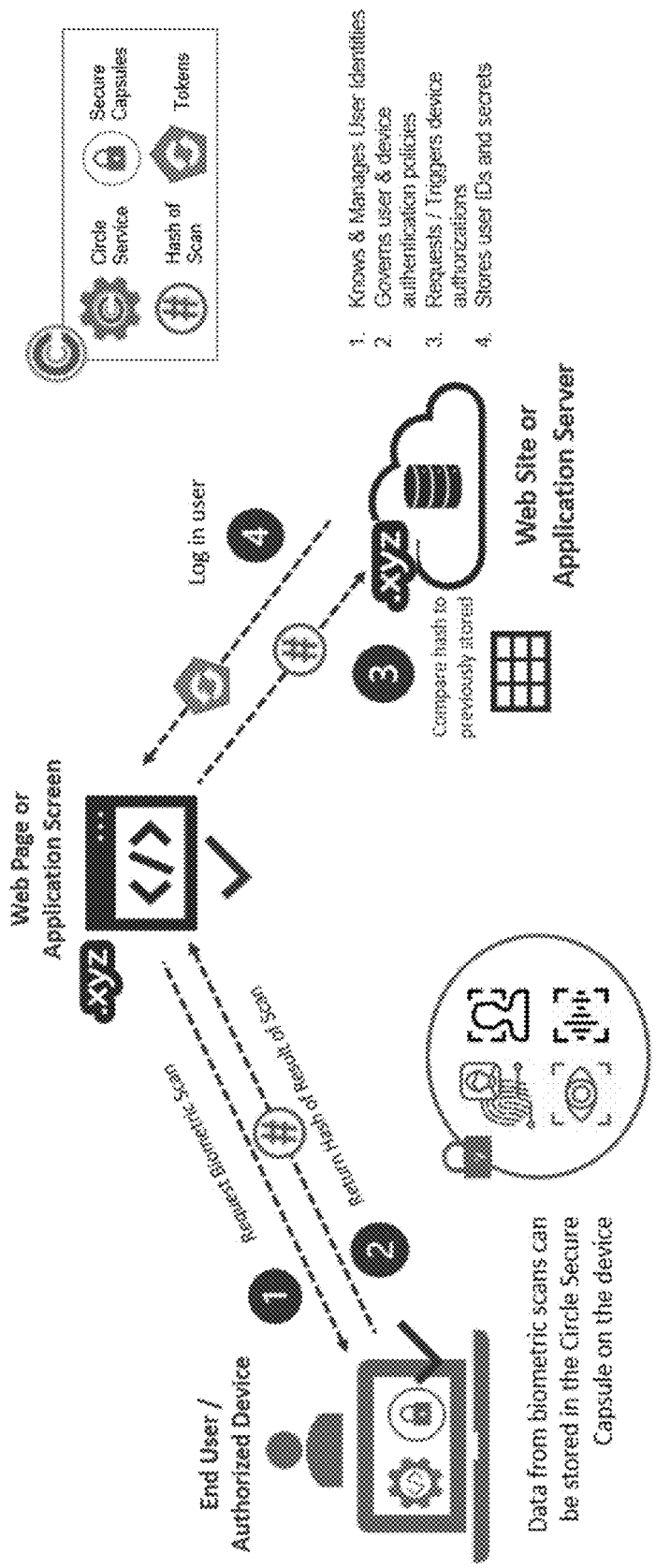
FIG. 4J Use of Secure Capsules for Other Types of Information Useful for Authentication

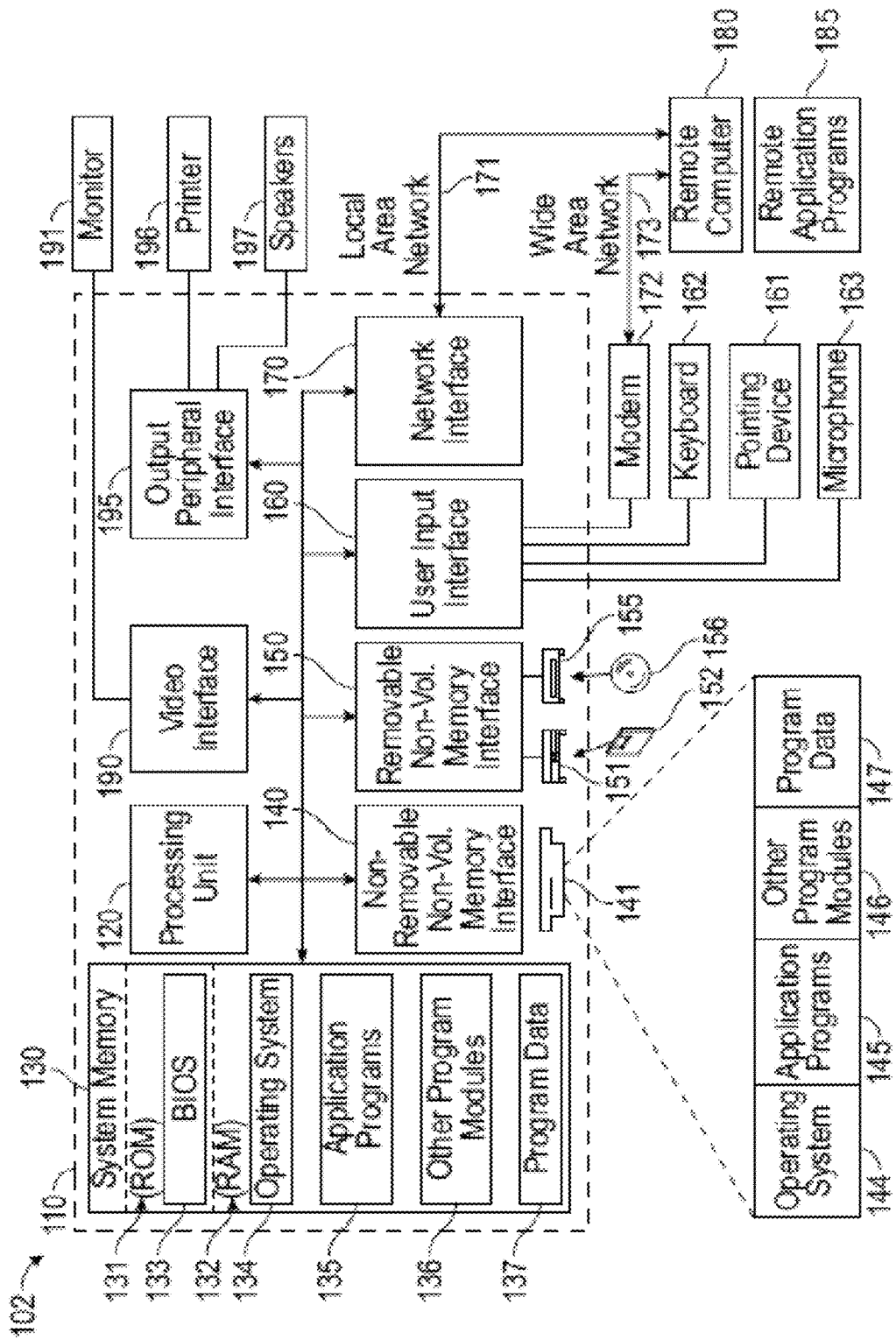
FIG. 5 is a diagram of an example computing system that may be used with some embodiments of the present invention.

CREDENTIAL-FREE AUTHENTICATION SYSTEMS AND METHODS

This application claims priority to Provisional Application Ser. No. 63/316,854 filed Mar. 4, 2022, the content of which is incorporated by reference.

The present invention relates to systems and methods for authentication.

BACKGROUND

The rise in security breaches and data theft is a growing concern in today's digital age, With more and more personal and sensitive information being stored online, there is a greater need for secure methods of accessing this information, Traditional authentication methods like passwords can be easily compromised, leading to data breaches and theft. Hackers can use methods such as phishing attacks, brute force attacks, or database breaches to obtain passwords, putting users' personal and financial information at risk. To address these security concerns, organizations are increasingly turning to credential-free authentication methods that provide stronger security and reduce the risk of breaches and theft.

The cloud is ubiquitous: any company looking to ramp up quickly will provision its computing, networking and storage with its preferred cloud provider, and get started rolling out their products. That makes total sense from a business perspective. The cloud has simplified development and automation exponentially over the years, and emerging tech such as AI and IoT will only accelerate this.

The catch though, is that the very same foundational architectures which drive the cloud's efficiency, flexibility and cost benefits ultimately also are its weakest links from a security perspective. The result is the daily march of headlines we all read about ever larger and deeper breaches of data and systems.

Credentials-based authentication—that is, username and password—is notoriously insecure and the source of 80%+ of data breaches today. Yet most end users still gain access to their Web sites and applications this way. Even worse, so do many DevOps and cloud engineers to their sensitive production cloud environments. Thankfully, a long overdue migration to passwordless authentication is now underway, with dozens of tools vying for supremacy, and more and more sites are deprecating password based authentication entirely.

While this is an important step forward, it still only solves part of the problem: not all passwordless authentication solutions are created equal. The new wave of solutions eliminate the password, but still have one or several intrinsic weaknesses derived from the same foundational flaw.

The need for credential-free authentication stems from the increasing number of security breaches and data theft incidents, Using traditional authentication methods like passwords can be easily compromised, leading to loss of sensitive information. Credential-free authentication, also known as passwordless authentication, eliminates the need for users to remember and manage passwords, reducing the risk of password-related security incidents. Instead, it uses alternative methods such as biometrics, one-time codes sent via text or email, or device-based authentication to verify the user's identity. This provides a more secure and convenient way of accessing information and services.

The current crop of passwordless authentication solutions remain vulnerable in three critical ways:

- They still rely on cloud databases of user credentials, which remain as vulnerable as ever. In fact, most are aggregating even more data on users' identities, their activities, their history and so on in a single place, making a hacker's job easier than ever.
- They rely heavily on user self-identification and authorization, ignoring the vulnerability of the means used to execute this: SMS and e-mail, which are both trivially spoofable using tools and techniques widely available to attackers.
- They add friction for the end user, which inevitably reduces compliance. Additional steps with authenticator apps, hardware tokens and even SMS-based SFA are too much for many users.

Due to this set of vulnerabilities, attacks can be executed literally from anywhere in the world, from any device, and by any hacker—whether an amateur or more sophisticated professionals. Even worse, it doesn't even require a human attacker—software, especially bots, malware, ransomware and even AI software, can probe and drive attacks that are often one step ahead of the AI monitoring being used to stop them.

SUMMARY OF THE INVENTION

In one aspect, systems and methods are disclosed for performing access control method by running a security software service as a localhost web service on an endpoint device; communicating with a system web server which manages licensing of the system and authentication of the endpoint device; creating a secure digital capsule that is controlled and can only be accessed by the system web server which authenticated the user and authorized the endpoint device; and placing on a distributed ledger messages and data files stored in the system in the secure digital capsules to detect and prevent alteration or manipulation of data.

In another aspect, a data security and credential-free authentication API that powers third-party applications, APIs, and IoT devices to securely collaborate and share data across networks, systems, and BYODs without compromising identity, privacy, or user experience is described herein. This is a system for a new method of authentication to access any resource that is connected via networking and protected by an access management and authorization system such as a web application server. The system may include (a) a web server which manages the licensing of the system and authentication of web application servers which use it; (b) a software service that is installed and runs as a local host web service on an endpoint device, where the software service may be authenticated by a licensed web application server such that a unique private AES 256 symmetric encryption key is generated on the endpoint device; and (c) a REST API that enables the web application server to communicate to the software service that is running on the endpoint device to request various operations. A REST API (also known as RESTful API) is an application programming interface (API or web API) that conforms to the constraints of a representational state transfer architectural style architectural style and allows for interaction with RESTful web services. REST stands for representational state transfer, This key can, in an embodiment, only be created on the endpoint device, and additional steps may be taken to hind and restrict the ability to use the key only to the endpoint device on which it was originally authorized. The unique private key may then be used to create a secure digital capsule controlled by the web server that can used to securely (a) store and retrieve secrets, certificates, user personal identity information or any other data or artifacts that can be used to perform authentications (hereinafter collectively termed "Secrets"); (h) collect and store biometric data for the authorized end user on the device (hereinafter collectively termed "Biometrics"); and (c) collect and store other data about the device security posture, user activity or any other activity or information that is useful and relevant for the Web application server to determine risk and enforce policies related to authentication and granting of access (hereinafter collectively termed "Device Risk Posture Information").

There are four characteristics of the system that contribute to its security, utility and uniqueness, First, the software service installed on the device performs as a local host web service on the endpoint device. After the initial set-up, the system web server has no role in authentication and no access to any data that is used to perform it. All communications and actions may only be performed between the application web server and the software service running on the local device. Second, the key is created and stored on the endpoint device and may never be shared with any web server. The web application server itself may never receive or store a copy of the key—the information stored in the secure capsule can only be requested by the web application server, and then decrypted locally on the device and transmitted to the web application server for authentication purposes. The system web server may also never receive or store any keys, nor can it request or in any way access information that is stored in secure capsules. Third, there is no centralized certificate authority or credentialling system required. The existence of the secure capsule on the endpoint device, and the use of the Secrets and/or Biometrics and/or Device Risk Posture Information by the web application server is all that is required for authentication. Fourth, the secure capsule can be replicated and synchronized to other devices controlled by the same end user. This allows a single user to have a device-based, credential-free authentication capability across multiple devices, browsers and contexts.

To integrate a web application server for use with the secure digital capsules of users, a developer associated with the web application server may obtain a license key to activate use of the API. The received license key may then be provided by the developer, along with credentials, to the API to provide the developer with control and access to the secure capsules of user devices, via a token. After this is completed, the API code may be integrated into authentication calls of the web site or application to allow the application to store and retrieve Secrets in the secure digital capsules on the endpoint devices, on which the secrets have been created and replicated.

To perform authentications with Secrets, the web application server can generate and store complex Secrets that are stored in its user identity database and access management system to authenticate users. These Secrets can then be securely transmitted to and stored in the secure capsule on the endpoint device that has been authenticated. The Secrets are never shared with the end user, and are not accessible to any other party or server other than the web application server, Whenever Secrets or other data are updated to the secure capsule on an endpoint device, the system will automatically synchronize these Secrets or data to any secure capsules replicated on other devices that the end user has added with the peer-to-peer method described above.

To perform authentications with Biometrics scans performed by the device operating system, the web application server can either keep a record in the secure capsule of the configuration and use of Biometrics scans performed by the operating system of the device to ensure that the Biometrics of the user at the time of original authentication are still the same (i.e. assure that is the same user). In this case, the web application server does not need to store any Secrets. It simply calls and requests the local Biometric scan to be run and checks to ensure that there has been no change of the end user of the device.

To perform authentications with Biometrics scans using software installed on the device, the web application server can request for the biometric scans directly and store them in the secure capsule. The encryption key of the secure capsule can be used to hash the Biometrics data, after which it can be securely transmitted and stored on the Web application server. Authentication of the user can then be performed by requesting a new hash of the Biometrics stored on the device and comparing it to the hash of the Biometrics previously stored.

To incorporate Device Risk Posture Information into the process of authentication, the Web application server installs software to collect this type of information on the endpoint device and store it in the secure capsule, can then request information at the time of each authentication that is useful to determine risk and enforce policies related to authentication and granting of access. An example of that is the monitoring of any change of the Biometrics of the end user of the device as described in paragraph [004] above, The web application server can also issue and manage tokens to an end user device in response to the end user device requesting access, or integrate with an associated security application or security web server to issue, manage and validate tokens. In this case, the security application or security web server would manage secrets and other methods of authentication of the end user, and send tokens to the web application, which would in turn store them in the secure capsule on the endpoint device, By way of example, a refresh token valid for a certain period of time could be sent and stored in the secure capsule, and the endpoint device would subsequently use the refresh token to request a new access token from the security application or security web server directly each time it requests access. Whenever the refresh token expires, the web application would have to re-authenticate with the security application or security web server to get a new refresh token and then resume as before.

BRIEF DESCRIPTION OF THE DRAWINGS

FIG. 1 shows an exemplary system with a Chain of Trust.

FIG. 2 shows an exemplary deployment of a Secure Capsule Across Multiple Devices to Provide access to Web Site/Application Server.

FIG. 3A shows exemplary Circles and Secure Capsules.

FIG. 3B shows an exemplary Circle Service.

FIG. 3C shows an exemplary Circle Web Server.

FIG. 4A shows an exemplary Set Up of the Web Server for Integration with. Circle CFA.

FIG. 4B shows an exemplary CFA End User Experience after Integration.

FIG. 4C shows an exemplary Authentication Flow for Circle Service.

FIG. 4D shows an exemplary Flow for Circle CFA.

FIG. 4E shows an exemplary process for Adding and. Authenticating Additional Devices.

FIG. 4H shows an exemplary CFA Flow—Auto-Reauthentication.

FIG. 4I shows an exemplary Use of Biometric Information for Granular Authentication.

FIG. 4J Use of Secure Capsules for Other Types of Information Useful for Authentication FIG. 5 is a diagram of an example computing system that may be used with some embodiments of the present invention.

DETAILED DESCRIPTION

Figure 4F:
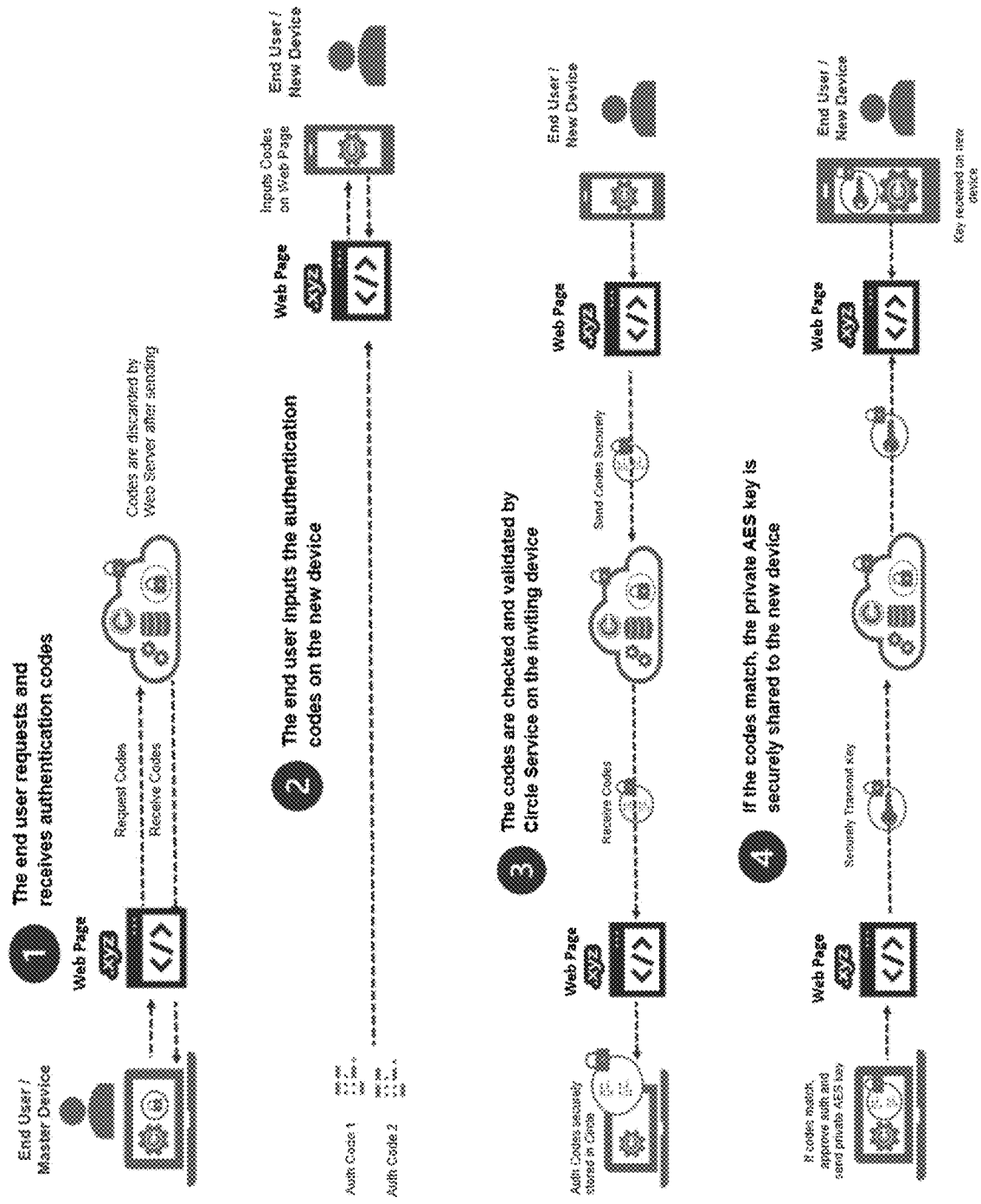
FIG. 4F: CFA Flow—Auto-Reauthentication.

Various examples of the present technology are discussed in detail below. While specific implementations are discussed, it should be understood that this is done for illustration purposes only. A person skilled in the relevant art will recognize that other components and configurations may be used without parting from the spirit and scope of the present technology.

Circle is an exemplary data security and credential-free authentication application programming interface ("API") that powers third-party applications, APIs, and Internet of Things devices to securely collaborate and share data across networks, systems, and Bring Your Own Devices ("BYODs") without compromising identity, privacy, or user experience. Circle allows developers to easily integrate unrivaled security, identity authentication and privacy protection capabilities into their applications as a single unified API.

The Circle platform provides a new method of authentication to access any resource that is connected via networking and protected by an access management and authorization system, such as Web Server for a web site, web application or device native application (a "Web Server"), to:
- eliminate the input and use of credentials (e.g. username and password) by the end user;
- uniquely restrict access to a specific device that has been authorized;
- allow end users to add and manage devices which are synchronized automatically; and
- allow end users to be authenticated across different Web browsers and contexts, and across all devices that have been synchronized, without any additional steps or effort.

This system has the following major components and methods.
1. A system web server which manages the licensing of the system and authentication of web application servers which use it,
2. A software service which is installed on the endpoint device by the system web server and runs as a localhost web service on an endpoint device.
3. A REST API that enables the Web Server to communicate to the software service that is running on the endpoint device to request various operations.
4. A method for the Web Server to authenticate the software service on an endpoint device, whereby the software service can generate a private AES 256 key on the endpoint device which is used to create a secure digital capsule that is controlled and can only be accessed by the Web Server which authenticated the user and authorized the device.
5. A method of enabling the Web server to store and retrieve data stored in the encrypted secure capsule on the endpoint device
6. A method of end-user initiated and fully autonomous multi-factor authentication that enables the end user to add other devices which share the same private AES 256 key, and synchronize the data in secure capsules across all such devices.
7. A method of locking all of the secure capsules of a specified user at the command of the Web server in order to block access to resources, and requiring the performance of multifactor authentication between the Web server and the end user in order to unlock the capsule and restore access to the end user.
8. An internal distributed ledger for all messages and data files stored in the system in secure capsules which can be used to detect and prevent any alteration or manipulation of data.

This system reduces breaches caused by:
- fallible human end users that are too busy and burdened to protect and use them securely; and
- credentials theft, spoofing, impersonation and other techniques that sophisticated hackers employ.

The system addresses the true root of the vulnerability that goes much deeper than just passwords. It is the Chain of Trust, shown in FIG. 1, that ultimately links back to and relies upon centralized, cloud based user ID directories and certificate authorities for authentication and authorization of devices.

A Credential-free Authentication is detailed next. This is a system for a new method of authentication to access any resource that is connected via networking and protected by an access management and authorization system such as Web Server for a web site, web application or device native application (a "Web Server") to:
a. eliminate the input and use of credentials (e.g. username and password) by the end user;
b. uniquely restricts access to a specific device that has been authorized;
c. enable end users to add and manage devices which are synchronized automatically; and
d. enable end users to be authenticated across different Web browsers and contexts, and across all devices that have been synchronized, without any additional steps or effort.
e. eliminate the input and use of credentials (e.g. username and password) by the end user; and
f. uniquely restrict access to a specific device that has been authorized.

Benefits include one or more of the following:
a. Supports credential-free authentication by creating a secure capsule for the storage of tokens or secrets that is cryptographically bound to each specific device.
b. Eliminates phishing and any other threats from stolen or lost credentials.
c. Works across browsers, devices and contexts using a one-time authentication.

FIG. 2 shows an exemplary deployment of a Secure Capsule Across Multiple Devices to Provide access to Web Site/Application Server. The secure AES 256 encrypted digital capsule, which is created on the endpoint devices of end users but controlled by the Web server of the application developer, is particularly useful. This provides a totally secure and private storage of authentication keys, secrets, information or any other data or files as desired on the endpoint device.

The software service on the device may be authenticated to ensure that the specific Web application server which has been licensed has access and control of the software service. The software service on the device can then interact with any number of separate application servers, each of which will be able to create their own secure capsules with separate keys, and only they have the right to open and use the data contained therein. The secure capsule itself is a local, client side secure data repository used by the application server that has created it.

Value Proposition of the system may include one or more of the following:
Ease of Use
  Radically improve log-in UX by eliminating password resets, lockouts and help desk tickets
  Works across browsers, devices and contexts.
Eliminate All Credentials-based Attacks
  Eliminates breaches, hacks, hostile capture of data from password loss, phishing, spoofing, etc.
Zero Attack Surface in the Cloud
  Reduces attack surfaces from the Cloud and company-wide to one endpoint, raising the cost of attack well beyond the means of hackers
Binds Access to Devices
  Secure capsules are cryptographically bound to their device and can thus be leveraged to restrict log-in only to authorized devices.
Easy and Rapid to Deploy
  All of this comes with unprecedented ease of deployment, onboarding and use.
Rapid Enterprise-Wide Deployment
  Just distribute & install Circle Service to devices via MDM (or other).
No VPN or Firewall
  As all traffic over routers and servers is E2EE, it requires no firewall, VPNs or other network and hardware configuration to ensure security.
Onboard Users Autonomously in Minutes
  Users install Circle Service and add and authorize their own devices without any need for IT or help desk support.
Flexible and Configurable
  What is stored in secure capsules and the checks required can be configured and managed in policies and permissions logic of the Web Server.

Circle API and System Components

FIG. 3A shows a system with Circles and Secure Capsules. In the context of a CFA, a Circle is a private network of unique endpoint devices tied to a user who is invited and added by a Circle Owner such as a web application or website. Every device that joins a Circle through a process of point-to-point invitation process may share a unique AES 256 encryption key, which protects all the data within the Circle. The system is agnostic to the method of encryption used, and in practice can incorporate and support new encryption standards and methods as desired. This includes user data and metadata used to communicate between the endpoint device and the web application or website which is the owner of the Circle. Thus, Circles are not only secure, but they are also totally private, with no visibility for outside actors into the contents, users or activities within them. Some important characteristics of Circles include the following:
  Keys Stored On Device, Not the Cloud—Only devices that have been invited and authorized to join a Circle have access to the keys. The keys are stored on each user's device. The device trusted platform module (TPM) may be used to protect & bind the keys cryptographically to the device upon which they were authorized.
  Circle Secure Capsules are AES 256 encrypted containers for anything—files, databases, structure & unstructured data. A Circle can contain any number of Public and Private capsules.
  Public Capsules are encrypted with the Circle key
  Private Capsules are separately created and encrypted with unique keys. The server may create and control the private capsules for specific purposes.
  Private capsules can also be Locked or Restricted
    Locked: Cannot be opened until a specified authentication operation is performed.
    Restricted: restricted from being opened according to rules that can be configured, contained and executed within the Circle.

The Circle Web Server manages the invitation & authorization process, communication between devices, data transport, and data back-up, storage and restoration. The Circle Web Server keeps copies of each Circle as encrypted data blobs. But it has no keys and zero ability to open them or even know what they are or who they belong to (other than knowing which customer has the license to use them).

FIG. 3B shows in more details the Circle Service. Circle Service powers the on-device functionalities of the Circle API. It can be delivered as a library for device native applications for use with an SDK, or as a lightweight thin client service for Web applications that communicates with the Circle API on the local machine using REST calls to a local host.

FIG. 3C shows an exemplary Circle Web Server which is a system comprising:
  Data Transport Service Bus
  Messaging
  Data back-up & restore
  Licensing.

For credential-free authentication, Circles can store secrets & hashes, certificates—anything helpful for user authentication and identity verification. Examples:
  Tokens
  Secrets
  Hashes
  Certificates
  Biometric scan data
  Device/User History & Activity
  Device Risk Posture The following figures illustrate and describe how the Circle API and system components are used to implement Credential-free Authentication ("CFA") for existing cloud systems or for a Web Server that is managing user identity, access control and permissions. Circle Service must be running on endpoint devices to create Circles for facilitating secure credential-free authentication.
  Only the application (owner of the Circle) itself can interact with and access the data stored within a Circle locally on the endpoint device.
  Even the end user—or an attacker that has gained access to or control of an endpoint device—cannot access the contents of the Circle.

Thus, from the perspective of the end user, there are no credentials to create, save or remember in the Circle CFA method. Further a user re-authentication can be executed without any use of credentials. These diagrams show the flow of authentication for an end user.

FIG. 4A shows an exemplary set up of the Web Server for Integration with Circle CFA. The application developer must first integrate the Circle API with the Web Server for their Web site, Web application or device native application and conFIG. it to work with Circle API. When a customer purchases a license, they get a Customer ID, AuthCode, AppKey and a Secret from Circle Web Server. Circle stores this customer information in its customer database.

FIG. 4B shows an exemplary CFA End User Experience after Integration. Once Circle API integration is completed by the Application developer, it works together seamlessly with their Web Server. There are two possible configurations:
  a. For a Web site or Web application, the end user installs the Circle Service the first time they want to use it.
  b. For a device native application or Web application that has installable components on end user devices, Circle Service would already be integrated and included in the application software that installed by the end user—i.e. there is no extra or separate installation of Circle Service required.

FIG. 4C shows an exemplary Authentication Flow for Circle Service. After installation, the first time that Circle Service is used on an end user device, it must be authenticated to ensure that only the customer Web Server can create its own unique Circle secure capsules and store and retrieve secrets on that device. This is the flow for that process.
  1. The customer Web Server calls GetToken on https://api.gocircle.ai to get a JWT. This call is to ensure that only the Circle Customer Web Server can call Circle Service.
  2. The returned JWT contains the CustomerCode, the AuthCode and endUserID and is signed by the Circle Service on the end user device (separately, not shown in FIG. 4C). The signing by the end user device gives the Web Server a token that can be used to authorize the creation of a new secure capsule for a new end user associated with the end user device.
  3. The Web page calls the Circle Service, passing in the JWT from step 2.
  4. The Circle Service calls back into https://api.gocircle.ai to validate the JWT.
  5. The returned Secret is the result of the check and the signed hash.
  6. True or False is returned to the Web page indicating success or failure.
  7. If successful, the Web page can now call the Circle Service and ask it to:
    a. create a Circle on the device (which is the container for Secure Capsules);
    b. embed the CustomerID (from the customer Web Server, used to create the JWT) inside the Circle secure capsules, which ensures that a given Customer can only gain access to Circles with its CustomerID.
  8. The Circle and secure capsule now exist on the device and the Web page and Web server can now use it to store and retrieve secrets used for authentication.

FIG. 4D shows an exemplary Flow for Circle CFA. The application Web server must be configured or customized to generate and store secrets first in the Web server, and then pass the secrets to the Circle Service to store in the Circle on the endpoint device. The secrets may include authentication data and/or encryption keys, and are stored in the secure capsules. For each access request from an endpoint device, the Web server queries Circle Service on the device through the Web page to get the authentication secret(s) that was stored.

In summary, after first authentication with the Customer Web Server, the secrets stored in the Circle on the device, and authentication is executed directly between the application and the local Circle Service running on the device.

FIG. 4E shows an exemplary process for Adding and Authenticating Additional Devices. End users usually have many different devices which they either own or access. This system of CFA is predicated upon the existence of a unique private AES 256 key on the device being the method of authentication. Therefore, it is important that end users have an easy but secure way to add and authenticate other devices they may wish to use to access resources protected by the Customer Web Server.

Circle CFA provides a method of end user driven autonomous multifactor authentication that enables the end user to add other devices which share the same private AES 256 key, and synchronize the data in the Circle across all such devices.

FIG. 4F shows an exemplary process where the End User can invite and authorize additional devices from the master device via Circle's previously patented distributed, peer-to-peer authentication process, with the use of two authorization codes that are communicated completely out-of-band.

Figure 4G:
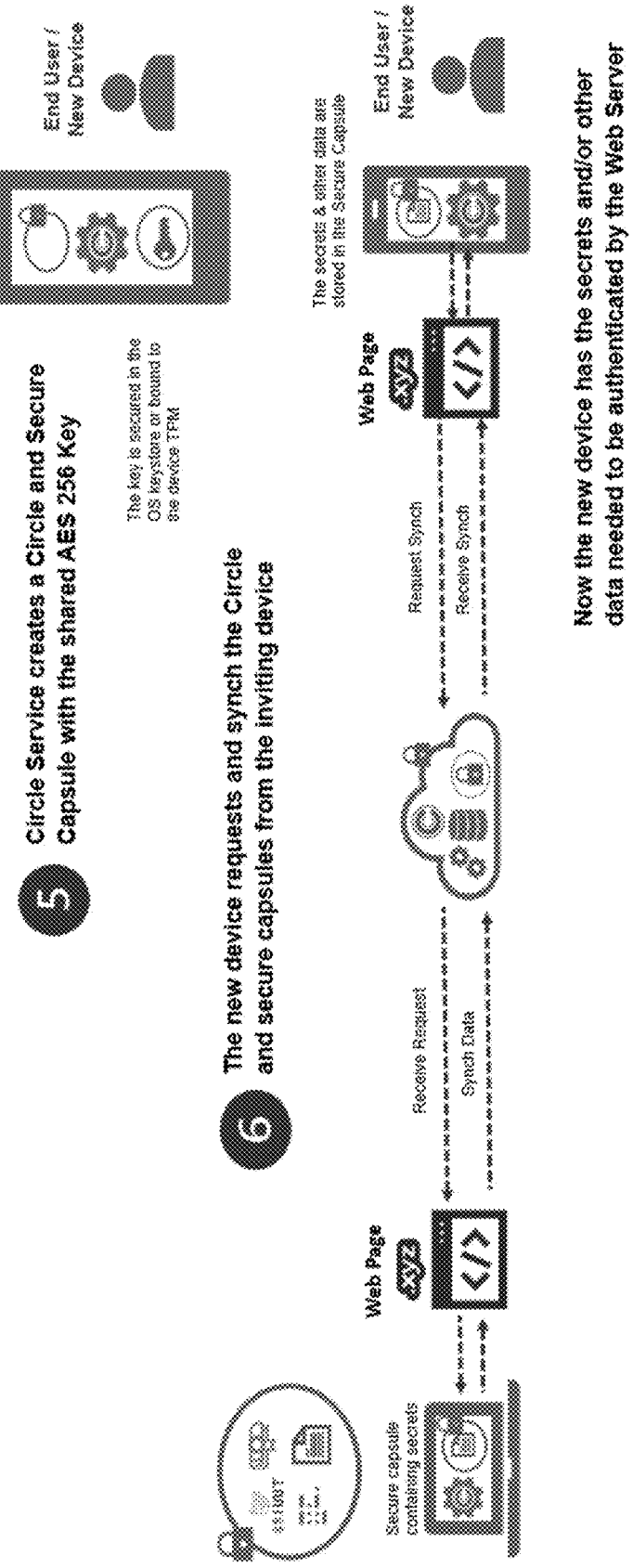
FIG. 4G: Use of Biometric Information for Granular Authentication.

FIG. 4G shows an exemplary process where the End User can invite and authorize as many additional devices as desired. The device IDs and authorization history can be shared with the Customer Web Server so it can also know and register all devices added by an end user.

FIG. 4H shows an exemplary CFA Flow—Auto-Reauthentication process. If the end user tries to login into the website or web application, but the website or web application requires a re-authentication of the end user before being permitted to access it, a two-factor re-authentication can be performed leveraging Circle's credential-free authentication method.

This method locks and unlocks access to the Circle on the endpoint device, which prevents or permits the use of the secrets stored in the secure capsules for authentication purposes. The re-authentication method uses temporary codes which are dynamically generated and sent to the user for self-verification. The method is completely independent of the identity verification information stored in the Customer Web Server, so would be unaffected by any breach of authentication there.

By default this method is executed independently by the Customer Web server and endpoint device.

FIG. 4I shows an exemplary Use of Biometric Information for Granular Authentication. As shown in FIG. 4I, access to the secrets for use in authentication is prevented by "locking" the secure capsule. The secure capsule can then be unlocked by the user via a two-factor authentication process. Codes are sent via two separate channels to previously stored addresses—e.g., email and mobile SMS. If the user can receive both and input, that proves the user has control of the email and the mobile phone (to a reasonable degree). Then Circle Service will unlock the device. This process differs from conventional two-factor authentication in that no security server is involved. The endpoint device, running Circle Services, operates as the security server instead.

In addition to tokens or secrets created at the time of authentication, the Customer Web Server could utilize biometric information from the end user (e.g. fingerprint, facial, retina or voice scans) and when additional security checks are desired, based on a policy or risk posture signal, when the end user tries to login.

Example Use Case #1: The Customer Web Server, using software installed on the endpoint device, would keep a record in the secure capsule of the configuration and use of Biometrics scans performed by the operating system of the device to ensure that the Biometrics of the user at the time of original authentication are still the same (i.e. assure that is the same user).

Example Use Case #2: The Customer Web Server, using software installed on the endpoint device, could request and execute biometric scans directly and store them in a secure capsule. The encryption key of the secure capsule can be used to hash the Biometrics data, after which it can be securely transmitted and stored on the Web application server. Authentication of the user can then be performed by requesting a new hash of the Biometrics stored on the device and comparing it to the hash of the Biometrics previously stored. This could all be executed locally on the device without sharing or exposing any biometric data to the Customer Web server In both of these cases, the Customer Web Server could, if desired, choose not to store any Secrets. It may instead call and request the local Biometric scan to be run, and check to insure that there has been no change of the end user of the device. Or Biometrics can be used in addition to stored Secrets. In either case, the user experience may be credential-free, FIG. 4J shows an exemplary use of Secure Capsules for Other Types of Information Useful for Authentication. Circle Secure Capsules can contain anything—files, databases, structured & unstructured data. Developers can also store policies, or even a rules engines and logic that is impervious to external attacks or interference.

Most of the data itself can be kept in the Cloud—and only called and served when needed like any cloud app. There is no limit to the amount or duration of data that can be stored securely in the Cloud. The keys, however, always remain and data can only be decrypted on the endpoint device. They can also be:

Private or Public;
Locked or Unlocked
Open or Restricted.

These characteristics can then interact with software, rules and configuration that are stored and run inside the Circle which contains them. This gives developers tremendous flexibility and power to build, manage and execute sophisticated authentication and authorization policies. Other information may be gathered and evaluated by the Customer Web Server to assess the risk a device or user poses. This information may be used to determine what level of authentication should be required, and three examples of the different types of information and corresponding authentication policies are described below.

Example #1: "Device Risk Posture Information"—defined here as data about the device security posture, user activity or any other activity or information that is useful and relevant for the Customer Web Server or any associated security application or server to determine risk and enforce policies related to authentication and granting of access.

To incorporate Device Risk Posture Information into the process of authentication, the Customer Web Server may install software to collect this type of information on the endpoint device and store it in the secure capsule. It can then request information at the time of each authentication that is useful to determine risk and enforce policies related to authentication and granting of access. Examples include the following:

any change of the Biometrics of the end user of the device as described above;
device activity—what has been installed, any modifications since last log-in, etc.;
user history—whether there have been other users on the device;
risk posture—what are the settings for various OS and security software installed.

Example #2: Policies which are configured and executed internally within a Circle by the use of Restricted Secure Capsules.

Example #3: Fractional encryption keys or other cryptographic techniques for policy enforcement, whereby different secure capsules would store different parts of a cryptographic process that must be completed in order to restore or gain access to a key needed to initiate or execute a restricted action.

Computer System

FIG. 5 is a diagram of an example computing system that may be used with some embodiments of the present invention. The computing system 102 is only one example of a suitable computing system, such as a mobile computing system, and is not intended to suggest any limitation as to the scope of use or functionality of the design. Neither should the computing system 102 be interpreted as having any dependency or requirement relating to any one or combination of components illustrated. The design is operational with numerous other general purpose or special purpose computing systems. Examples of well-known computing systems, environments, and/or configurations that may be suitable for use with the design include, but are not limited to, personal computers, server computers, hand-held or laptop devices, multiprocessor systems, microprocessor-based systems, set top boxes, programmable consumer electronics, mini-computers, mainframe computers, distributed computing environments that include any of the above systems or devices, and the like. For example, the computing system 102 may be implemented as a mobile computing system such as one that is configured to run with an operating system (e.g., iOS) developed by Apple Inc. of Cupertino, California or an operating system (e.g., Android) that is developed by Google Inc. of Mountain View, California.

Some embodiments of the present invention may be described in the general context of computing system executable instructions, such as program modules, being executed by a computer. Generally, program modules include routines, programs, objects, components, data structures, etc. that performs particular tasks or implement particular abstract data types. Those skilled in the art can implement the description and/or figures herein as computer-executable instructions, which can be embodied on any form of computing machine readable media discussed below.

Some embodiments of the present invention may also be practiced in distributed computing environments where tasks are performed by remote processing devices that are linked through a communications network. In a distributed computing environment, program modules may be located in both local and remote computer storage media including memory storage devices.

Referring to FIG. 5, the computing system 102 may include, but are not limited to, a processing unit 120 having one or more processing cores, a system memory 130, and a system bus 121 that couples various system components including the system memory 130 to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA)

bus, Micro Channel Architecture (MCA) bus, Enhanced ISA (EISA) bus, Video Electronics Standards Association (VESA) locale bus, and Peripheral Component Interconnect (PCI) bus also known as Mezzanine bus.

The computing system 102 typically includes a variety of computer readable media. Computer readable media can be any available media that can be accessed by computing system 102 and includes both volatile and nonvolatile media, removable and non-removable media. By way of example, and not limitation, computer readable media may store information such as computer readable instructions, data structures, program modules or other data. Computer storage media include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing system 102. Communication media typically embodies computer readable instructions, data structures, or program modules.

The system memory 130 may include computer storage media in the form of volatile and/or nonvolatile memory such as read only memory (ROM) 131 and random access memory (RAM) 132. A basic input/output system (BIOS) 133, containing the basic routines that help to transfer information between elements within computing system 102, such as during start-up, is typically stored in ROM 131. RAM 132 typically contains data and/or program modules that are immediately accessible to and/or presently being operated on by processing unit 120. By way of example, and not limitation, FIG. 5 also illustrates operating system 134, application programs 135, other program modules 136, and program data 137.

The computing system 102 may also include other removable/non-removable volatile/nonvolatile computer storage media. By way of example only, FIG. 5 also illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as, for example, a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computing system 102. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. The operating system 144, the application programs 145, the other program modules 146, and the program data 147 are given different numeric identification here to illustrate that, at a minimum, they are different copies.

A user may enter commands and information into the computing system 102 through input devices such as a keyboard 162, a microphone 163, and a pointing device 161, such as a mouse, trackball or touchpad or touch screen. Other input devices (not shown) may include a joystick, gamepad, scanner, or the like. These and other input devices are often connected to the processing unit 120 through a user input interface 160 that is coupled with the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 190.

The computing system 102 may operate in a networked environment using logical connections to one or more remote computers, such as a remote computer 180. The remote computer 180 may be a personal computer, a handheld device, a server, a router, a network PC, a peer device or other common network node, and typically includes many or all of the elements described above relative to the computing system 102. The logical connections depicted in FIG. 5 include a local area network (LAN) 171 and a wide area network (WAN) 173, but may also include other networks. Such networking environments are commonplace in offices, enterprise-wide computer networks, intranets and the Internet.

When used in a LAN networking environment, the computing system 102 may be connected to the LAN 171 through a network interface or adapter 170. When used in a WAN networking environment, the computing system 102 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computing system 102, or portions thereof, may be stored in a remote memory storage device. By way of example, and not limitation, FIG. 5 illustrates remote application programs 185 as residing on remote computer 180. It will be appreciated that the network connections shown are exemplary and other means of establishing a communications link between the computers may be used.

It should be noted that some embodiments of the present invention may be carried out on a computing system such as that described with respect to FIG. 5. However, some embodiments of the present invention may be carried out on a server, a computer devoted to message handling, handheld devices, or on a distributed system in which different portions of the present design may be carried out on different parts of the distributed computing system.

Another device that may be coupled with the system bus 121 is a power supply such as a battery or a Direct Current (DC) power supply) and Alternating Current (AC) adapter circuit. The DC power supply may be a battery, a fuel cell, or similar DC power source that needs to be recharged on a periodic basis. The communication module (or modem) 172 may employ a Wireless Application Protocol (WAP) to establish a wireless communication channel. The communication module 172 may implement a wireless networking standard such as Institute of Electrical and Electronics Engineers (IEEE) 802.11 standard, IEEE std. 802.11-1999, published by IEEE in 1999.

Examples of mobile computing systems may be a laptop computer, a tablet computer, a Netbook, a smart phone, a personal digital assistant, or other similar device with on board processing power and wireless communications ability that is powered by a Direct Current (DC) power source that supplies DC voltage to the mobile computing system and that is solely within the mobile computing system and needs to be recharged on a periodic basis, such as a fuel cell or a battery.

In the preceding, reference is made to embodiments presented in this disclosure. However, the scope of the present disclosure is not limited to specific described embodiments. Instead, any combination of the preceding features and elements, whether related to any given embodiments or not, is contemplated to implement and practice contemplated embodiments. Furthermore, although embodiments disclosed herein may achieve advantages over other possible solutions or over the prior art, whether or not a particular advantage is achieved by a given embodiment is not limiting of the scope of the present disclosure. Thus, the aspects, features, embodiments and advantages discussed above are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

Aspects of the present disclosure may take the form of an entirely hardware embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples a computer readable storage medium include: an electrical connection having one or more wires, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the current context, a computer readable storage medium may be any tangible medium that can contain, or store a program.

While the foregoing is directed to embodiments of the present disclosure, other and further embodiments of the disclosure may be devised without departing from the basic scope thereof, and the scope thereof is determined by the claims that follow.

What is claimed is:

1. An access control method, comprising:
running a security software service as a localhost web service on a user endpoint device;
communicating with a system web server which manages licensing of the system and authentication of the user endpoint device;
creating a secure digital capsule stored on the user endpoint device that is controlled and can only be accessed by the system web server which authenticated the user and authorized the user endpoint device, the secure digital capsule is encrypted;
performing the user initiated and autonomous multi-factor authentication that enables the user to add other devices sharing same private key, and synchronizing the data in secure digital capsules across all such devices wherein the private key is used to securely store and retrieve secrets, certificates, and user personal identity information to perform authentications, wherein the secure digital capsules comprise secrets, certificates, and user personal identity information; and
placing on a distributed ledger messages and data files stored in the system in the secure digital capsules to detect and prevent alteration or manipulation of data.

2. The method of claim 1, comprising a representational state transfer architectural style application programming interface (REST API) that enables the system web server to communicate to the software service that is running on the user endpoint device to request operations.

3. The method of claim 1, wherein the user endpoint device comprises an Internet of Things (IoT) device.

4. The method of claim 1, wherein the system web server authenticates the security software service on the user endpoint device, where the software service generates the private key on the user endpoint device which is used to create the secure digital capsule controlled and only accessible by the system web server which authenticated the user and authorized the user endpoint device.

5. The method of claim 1, comprising enabling the system web server to store and retrieve data stored in the encrypted secure digital capsule on the user endpoint device.

6. The method of claim 1, comprising locking all of the secure capsules of a specified user at the command of the system web server to block access to resources, and requiring the performance of multifactor authentication between the Web server and the specified user in order to unlock the capsule and restore access to the specified user.

7. The method of claim 1, wherein the private key is used to create the secure digital capsule controlled by the system web server.

8. The method of claim 1, wherein the private key is used to securely
(b) collect and store biometric data for the authorized user on the device; and
(c) collect and store data about the device security posture, user activity or any other activity or information to determine risk and enforce policies related to authentication and granting of access.

9. A secured endpoint device, comprising:
a hardware storage device coupled to a processor adapted to communicate with a system web server which manages the licensing of the system and authentication of web application servers, the processor executing code for:
running a security software service as a localhost web service on a user endpoint device; communicating with a system web server which manages licensing of the system and authentication of the endpoint device;
creating a secure digital capsule stored on the user endpoint device that is controlled and can only be accessed by the system web server which authenticated the user and authorized the user endpoint device, the secure digital capsule is encrypted;

performing the user initiated and autonomous multi-factor authentication that enables the user to add other devices sharing same private key, and synchronizing the data in secure digital capsules across all such devices wherein the private key is used to securely store and retrieve secrets, certificates, and user personal identity information to perform authentications, wherein the secure digital capsules comprise secrets, certificates, and user personal identity information; and placing on a distributed ledger messages and data files stored in the system in the secure digital capsules to detect and prevent alteration or manipulation of data.

10. The device of claim 9, comprising a representational state transfer architectural style application programming interface (REST API) that enables the system web server to communicate to the software service that is running on the user endpoint device to request operations.

11. The device of claim 9, wherein the user endpoint device comprises an Internet of Things (IoT) device.

12. The device of claim 9, wherein the system web server authenticates the security software service on the user endpoint device, where the software service generates a private key on the user endpoint device which is used to create the secure digital capsule controlled and only accessible by the system web server which authenticated the user and authorized the user endpoint device.

13. The device of claim 9, wherein the system web server is adapted to store and retrieve data stored in the encrypted secure digital capsule on the user endpoint device.

14. The device of claim 9, wherein the system web server locks one or more secure capsules of a specified user at the command of the system web server to block access to resources, and requires a multifactor authentication between the system web server and the specified user to unlock the capsule and restore access to the specified user.

15. The device of claim 9, wherein the private key is used to create the secure digital capsule controlled by the system web server.

16. The device of claim 9, wherein the private key is used to securely
   (b) collect and store biometric data for the authorized end user on the device; and
   (c) collect and store data about the device security posture, user activity or any other activity or information to determine risk and enforce policies related to authentication and granting of access.

\* \* \* \* \*